(12) United States Patent
Hadar et al.

(10) Patent No.: US 8,490,150 B2
(45) Date of Patent: Jul. 16, 2013

(54) SYSTEM, METHOD, AND SOFTWARE FOR ENFORCING ACCESS CONTROL POLICY RULES ON UTILITY COMPUTING VIRTUALIZATION IN CLOUD COMPUTING SYSTEMS

(75) Inventors: Ethan Hadar, Nesher (IL); Nimrod Vax, Tel Aviv (IL); Amir Jerbi, Givatayim (IL); Michael Kletskin, Matan (IL)

(73) Assignee: CA, Inc., Islandia, NY (US)

( * ) Notice: Subject to any disclaimer, the term of this patent is extended or adjusted under 35 U.S.C. 154(b) by 713 days.

(21) Appl. No.: 12/565,318

(22) Filed: Sep. 23, 2009

(65) Prior Publication Data

US 2011/0072486 A1   Mar. 24, 2011

(51) Int. Cl.
*G06F 17/00* (2006.01)
*H04L 29/06* (2006.01)

(52) U.S. Cl.
CPC ................... *H04L 63/20* (2013.01)
USPC ............................................................. 726/1

(58) Field of Classification Search
USPC ......................................................... 726/1–3
See application file for complete search history.

(56) References Cited

U.S. PATENT DOCUMENTS

2007/0250833 A1* 10/2007 Araujo et al. ..................... 718/1
2008/0205377 A1*  8/2008 Chao et al. ..................... 370/351
2010/0332630 A1* 12/2010 Harlow .......................... 709/221

* cited by examiner

*Primary Examiner* — Peter Shaw
(74) *Attorney, Agent, or Firm* — Baker Botts, LLP

(57) ABSTRACT

According to one embodiment, a system comprises one or more processors coupled to a memory and executing logic. A policy life cycle component is configured to maintain a repository of security policies. The repository of security policies comprises policies governing access to a virtual host and to a plurality of virtual machines running on the virtual host. The policy life cycle component is also configured to issue a compound policy for an identified virtual operating system running on the virtual host. The compound policy provides a virtual host policy and access rules for each of the plurality of virtual machines running on the virtual host. A topology manager is configured to receive the compound policy from the policy life cycle component, assign the compound to an access control agent, and maintain a security policy topology. The security policy topology stores associations between access control agents and compound policies.

21 Claims, 4 Drawing Sheets

SYSTEM, METHOD, AND SOFTWARE FOR ENFORCING ACCESS CONTROL POLICY RULES ON UTILITY COMPUTING VIRTUALIZATION IN CLOUD COMPUTING SYSTEMS

TECHNICAL FIELD

The present invention relates generally to computer management, and more particularly to a system, method, and software for enforcing access control policy rules on utility computing virtualization in cloud computing systems.

BACKGROUND

Cloud computing systems include computing resources. For example, cloud computing systems may include servers, network storage devices, and other information technology (IT) services. Cloud computing systems include proprietary interfaces to access their respective computing resources.

SUMMARY

According to one embodiment, a system comprises one or more processors coupled to a memory and executing logic. A policy life cycle component is configured to maintain a repository of security policies. The repository of security policies comprises policies governing access to a virtual host and to a plurality of virtual machines running on the virtual host. The policy life cycle component is also configured to issue a compound policy for an identified virtual operating system running on the virtual host. The compound policy provides a virtual host policy and access rules for each of the plurality of virtual machines running on the virtual host. A topology manager is configured to receive the compound policy from the policy life cycle component, assign the compound to an access control agent, and maintain a security policy topology. The security policy topology stores associations between access control agents and compound policies.

Certain embodiments of the present invention may provide one or more technical advantages. For example, a technical advantage of one embodiment may include the capability to protect the physical boundaries of virtual machines in a cloud computing environment. A technical advantage of one embodiment may also include the capability to increase enforcement on operating systems that support virtualization. A technical advantage of one embodiment may also include the capability to restrict virtual I/O access. A technical advantage of one embodiment may also include the capability to minimize the footprint of access control agents.

While specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale.

Figure 1:
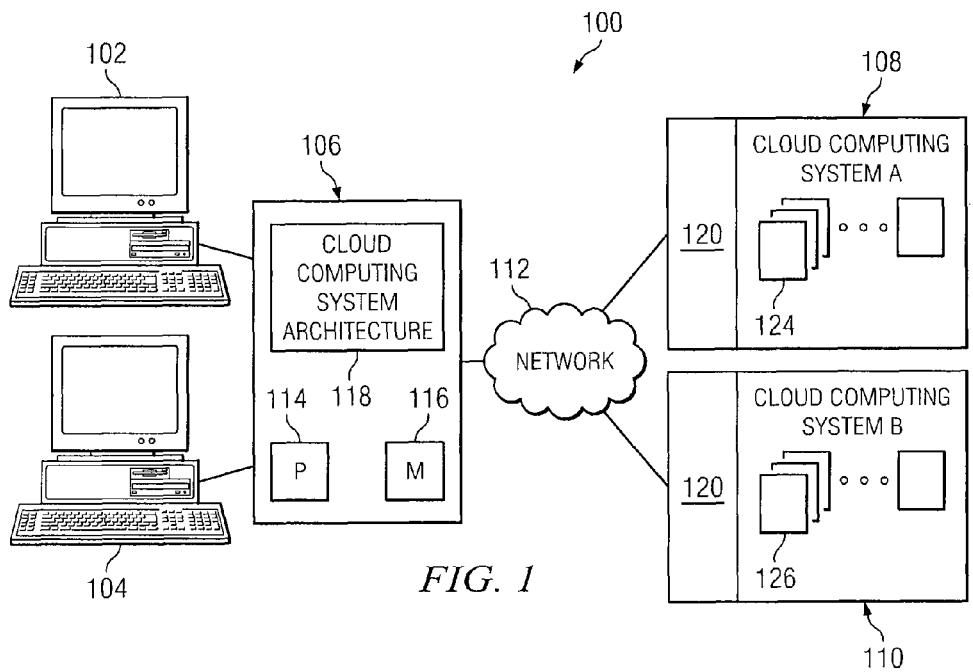
FIG. 1 illustrates an example system for enforcing access control policy rules, according to certain embodiments.

FIG. 1 illustrates an example system 100 for enforcing access control (or, "AC") policy rules in cloud computing systems according to some embodiments. System 100 may include one or more user systems 102 and one or more administrative systems 104, one or more server systems 106, one or more cloud computing systems 108 and 110, and a network 112. Although this particular implementation of system 100 is illustrated and primarily described, embodiments may include any suitable implementation of system 100 according to particular needs.

In general, system 100 is operable to integrate between IT Information Library (ITIL) software components (such as ITIL V3 and any future versions of ITIL in EITM) and cloud computing systems. In certain embodiments, system 100 includes a cloud computing system architecture for integrating cloud computing systems with ITIL software components. For example, an external integration architecture may include several ITIL software components. According to certain embodiments, adapters are created in a cloud computing system architecture that bridge the architectural layer that encapsulates and abstracts the cloud computing systems while still integrating with enterprise ITIL software components. Thus, certain embodiments provide a set of components for life cycle phases of ITIL service management, from strategy to design, transition, and operation. In certain embodiments, the cloud computing system architecture is mapped to the different layers of the cloud computing systems, thus serving IT workshops and workers that rent cloud computing resources and manage the cloud computing systems within their own IT organization in an abstract manner. In certain embodiments, the cloud computing system architecture may serve the cloud computing system providers that manage their cloud computing systems and provide ITIL integration points to their customers.

System 100 may include one or more user systems 102 and one or more administrative systems 104. "User system 102" and "user of user system 102" may be used interchangeably. A user of user system 102 may include, for example, a human user or a computer program or other suitable software module for automatically interacting with user system 102. Likewise, "administrative system 104" and "user of administrative system 104" may be used interchangeably. A user of administrative system 104 may include, for example, a human user or a computer program or other suitable software module for automatically interacting with administrative system 104.

Each user system 102 and administrative system 104 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user of administrative system 104. Each computer system may include a personal computer, workstation, network computer, kiosk, wireless data port, personal data assistant (PDA), one or more processors within these or other devices, or any other suitable processing device. As an example, system 100 may include multiple distributed user systems 102 and/or administrative systems 104. User systems 102 and administrative systems 104 may be physically distributed, being in different locations geographically remote from each other and from the other components of system 100, or logically distributed, being at approximately the same location as other user systems 102 and administrative systems 104 and the other components of system 100. For simplicity, the one or more user systems 102 and administrative systems 104 of system 100 are referred to throughout this description primarily in the singular. Although user system 102 and administrative system 104 are illustrated and primarily described as being separate, it is understood that the computer systems and the functionality associated with user system 102 and administrative system 104 may be combined or separated in any suitable manner.

System 100 may include one or more server systems 106, referred to primarily in the singular throughout the remainder of this description. Server system 106 may include one or more electronic computing devices operable to receive, transmit, process, and store data associated with system 100. For example, server system 106 may include one or more general-purpose PCs, Macintoshes, workstations, Unix-based computers, server computers, one or more server pools, or any other suitable devices. In certain embodiments, server system 106 includes a web server. In short, server system 106 may include any suitable combination of software, firmware, and hardware. Although a single server system 106 is illustrated, some embodiments contemplate system 100 including any suitable number of server systems 106. Moreover, although referred to as a "server system," some embodiments contemplate server system 106 comprising any suitable type of processing device or devices.

Server system 106 may be communicatively coupled to cloud computing systems 108 and 110 via network 112. Although not illustrated, user system 102 and administrative system 104 may be communicatively coupled to one another as well as to server system 106 via network 112. Network 112 facilitates wireless or wireline communication. Network 112 may communicate, for example, IP packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Server system 106 may include a processing module 114 and a memory module 116. Processing module 114 may include one or more microprocessors, controllers, or any other suitable computing devices or computing resources. Processing module 114 may work, either alone or with other components of system 100, to provide a portion or all of the functionality of system 100 described herein. Memory module 116 may take the form of volatile or non-volatile memory including, without limitation, magnetic media, optical media, random access memory (RAM), read-only memory (ROM), removable media, or any other suitable memory component. Although a single server system 106 is illustrated, some embodiments contemplate system 100 including any suitable number of server systems 106. Moreover, although referred to as a "server system," some embodiments contemplate server system 106 comprising any suitable type of processing device or devices.

System 100 may include one or more cloud computing systems 108 and 110. Cloud computing systems 108 and 110 may include one or more electronic computing devices operable to receive, transmit, process, and store data associated with system 100. For example, cloud computing systems 108 and 110 may include one or more general-purpose PCs, Macintoshes, workstations, Unix-based computers, server computers, one or more server pools, or any other suitable devices. In short, cloud computing systems 108 and 110 may include any suitable combination of software, firmware, and hardware. It should be noted that although two cloud computing systems 108 and 110 are illustrated, any suitable number of cloud computing systems may be included in system 100. In addition, there may be multiple groups of cloud computing systems in system 100.

In certain embodiments, cloud computing systems 108 and 110 provide computing resources 124 and 126, respectively, to user systems 102 and administrative systems 104 and charges user systems 102 and administrative systems 104 for their specific use of computing resources 124 and 126. For example, cloud computing resources 124 and 126 may include one or more virtual machines. As another example, cloud computing resources 124 and 126 may include one or more machine images. A machine image may refer to a bootable file that includes a particular configuration and operating system. As yet another example, cloud computing resources 124 and 126 may include one or more Intel x86 based servers that provide a combination of hardware and software resources.

In certain embodiments, computing resources 124 and 126 may be accessible by cloud computing interfaces 120. From the perspective of user systems 102 and administrative systems 104, renting computing resources from cloud computing interfaces 120 has implications for application providers and IT architects that develop solutions targeted for internal enterprise deployment, rather than on cloud computing systems 108 and 110. For example, an IT architect may desire to deploy web servers, load balancers, and front-end interfaces remotely on cloud computing systems 108 and 110 but keep a database in a local IT environment. Further, from an ITIL process perspective, many large organizations may implement an ITIL approach by performing well-defined automated processes. Since an ITIL process may be agnostic to platform and technological tools, it may be desirable to integrate such practices with advances in technology, such as cloud computing systems 108 and 110.

In certain embodiments, server system 106 may include a cloud computing system architecture 118. Cloud computing system architecture 118 may refer to any suitable hardware and/or software operable to integrate ITIL software components with cloud computing systems 108 and 110 and their respective computing resources 124 and 126. For example, a connection may be established between cloud computing system architecture 118 and cloud computing systems 108 and 110. A second connection may be established between cloud computing system architecture 118 and an external integration architecture that includes the ITIL software components. As described in more detail below, cloud computing system architecture 118 includes management components that provide integration points to connect the ITIL software components with computing resources 124 and 126 of cloud computing systems 108 and 110.

In certain embodiments, a secure connection may be established between cloud computing system architecture 118 and cloud computing systems 108 and 110 over network 112. For example, a secure Hypertext Transfer Protocol (HTTP) connection may be established between cloud computing system architecture 118 and cloud computing systems 108 and 110. A secure HTTP protocol refers to a protocol that provides the ability for secure transactions to take place over network 112. In alternative networks, any suitable data communications protocol may be used to establish a secure connection. Additional details of example embodiments of cloud computing system architecture 118 are discussed in more detail below.

Figure 2:
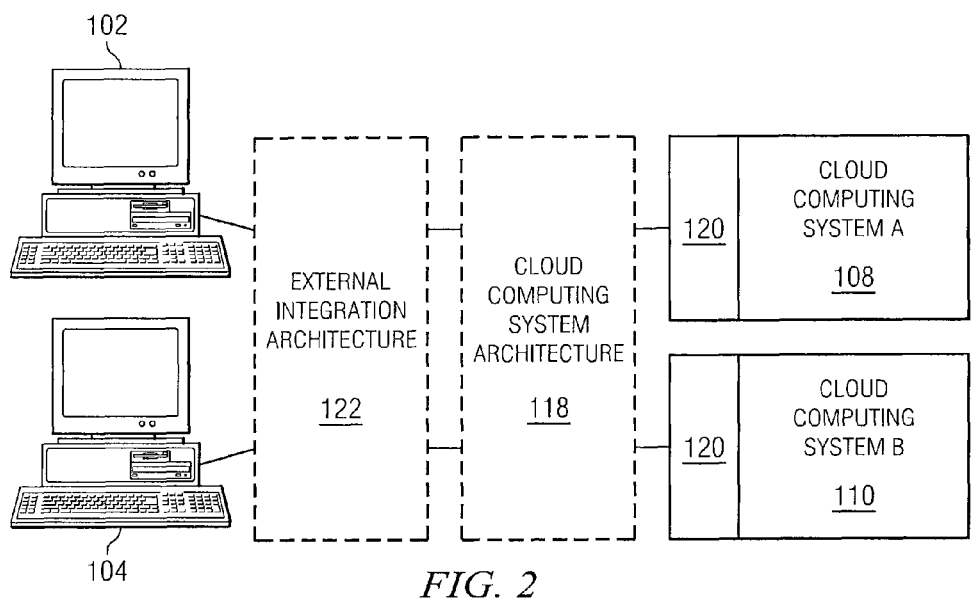
FIG. 2 illustrates an example external integration architecture and the cloud computing system architecture of FIG. 1, according to certain embodiments.

FIG. 2 illustrates external integration architecture 122 and cloud computing system architecture 118 of FIG. 1 according to some embodiments. As described above, external integration architecture 122 may include several ITIL software components. For example, external integration architecture 122 may include an ITIL software component that enables organization of the IT strategies and ongoing initiatives. As another example, external integration architecture 122 may include an ITIL software component that sets and monitors agreements based on service requests, negotiates with supply chain managers, sets agreements for operations and services, and/or catalogs the results. As yet another example, external integration architecture 122 may include an ITIL software component that captures defined and offered services. As yet another example, external integration architecture 122 may include an ITIL software component that performs continuous analysis in order to evaluate service trends for optimization. As yet another example, external integration architecture 122 may include an ITIL software component that maintains the deployment of the designed services, tracking and reporting the deployed assets within an organization, and/or maintains information on the topology and system infrastructure and the life cycle for design changes and releases. As yet another example, external integration architecture 122 may include an ITIL software component that measures the services provided on an ongoing basis with the goal of ensuring a high level of quality is maintained across the IT investments, displays the overall status and health of the system to the consumer, and/or maintains ongoing provisioning, recovery, backup and redundancy of the IT assets within a datacenter, including countermeasures and remedies. As yet another example, external integration architecture 122 may include an ITIL software component that provides proactive planning capabilities through the analysis of IT behavior, detects, utilization patterns and change history, determines if Service Level Agreements (SLAs) are being met, alerts a consumer that a problem is starting to appear, which may provide the consumer with the possibility of mitigating the issue before it becomes critical. As yet another example, external integration architecture 122 may include an ITIL software component that manages users and controls their access to the resources in the system based on, for example, their organizational role. As yet another example, external integration architecture 122 may include an ITIL software component that manages the distributed data stores for the organization, provisions and allocates storage resources, and/or provides the ability to restore IT services back to operation through a workflow and life cycle of incidents that concludes with incident resolution. As described in more detail below, computing system architecture 118 includes management components that provide integration points to connect the ITIL software components with computing resources of cloud computing systems 108 and 110.

Figure 3:
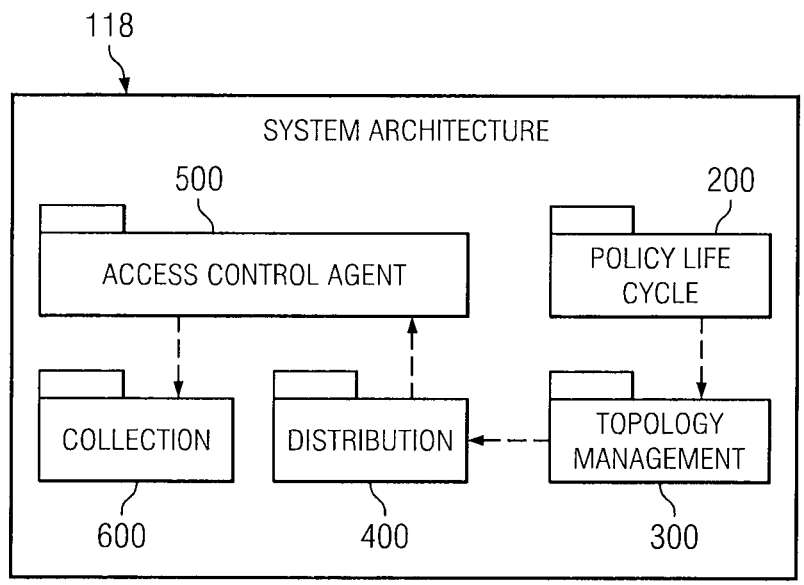
FIG. 3 illustrates example details of the cloud computing system architecture of FIGS. 1 and 2, according to certain embodiments.

FIG. 3 illustrates example details of the cloud computing system architecture 118 of FIGS. 1 and 2 according to some embodiments. The cloud computing system architecture 118 of FIG. 3 features a policy life cycle component 200, a topology management component 300, a distribution component 400, an access control agent 500, and a collection component 600. Although this particular implementation of the cloud computing system architecture 118 is illustrated and primarily described, embodiments may include any suitable implementation of the cloud computing system architecture 118 according to particular needs.

In some embodiments, the policy life cycle component 200 may be responsible for defining and configuring security compliance rules of different types, such as for hosts, databases, devices, and applications. In addition, the policy life cycle component 200 may manage the life cycle of a deployed policy by managing the type and time of policy deployment. Also, in some embodiments, a set of configured policies might not be active, but the policy life cycle component 200 may collect and purify inactive policies. Additional details of certain embodiments of the policy life cycle component 200 will be discussed in greater detail in conjunction with FIG. 4.

In some embodiments, the topology management component 300 may be responsible for maintaining the modeled status of an enforced IT environment. In some embodiments, the topology management component 300 may receive a prepared policy from the policy life cycle component 200, organize the prepared policy into a topological Model Data Repository (MDR) repository, and deploy one or more agents, such as the access control agent 500, through the distribution component 400. Additional details of certain embodiments of the policy life cycle component 300 will be discussed in greater detail in conjunction with FIG. 5.

In some embodiments, the distribution component 400 may be responsible for deploying policies to the agents. For example, in one embodiment, the distribution component 400 may distribute policies from the topology management component 300 to one or more agents, such as the access control agent 500.

In some embodiments, the access control agent 500 may be responsible for deploying policies to the agents. In some embodiments, the access control agent 500 may represent an agent installed on a managed host, whether the managed host is real or virtual. In these embodiments, the access control agent 500 may enforce security rules on the managed host. In some embodiments, the access control agent 500 may also be responsible for providing connectivity with a main server, such as the server 106 of FIG. 1. In some embodiments, the access control agent 500 may provide reports on the status of security enforcement or enable other event logging. Additional details of certain embodiments of the access control agent 500 will be discussed in greater detail in conjunction with FIG. 6.

In some embodiments, the collection component 600 may be responsible for collecting information from the agents. For example, in one embodiment, the collection component 600 may receive reports or information, such as audit information, from the access control agent 500. In some embodiments, the collection component 600 may forward collected information to a central repository for further analysis.

Figure 4:
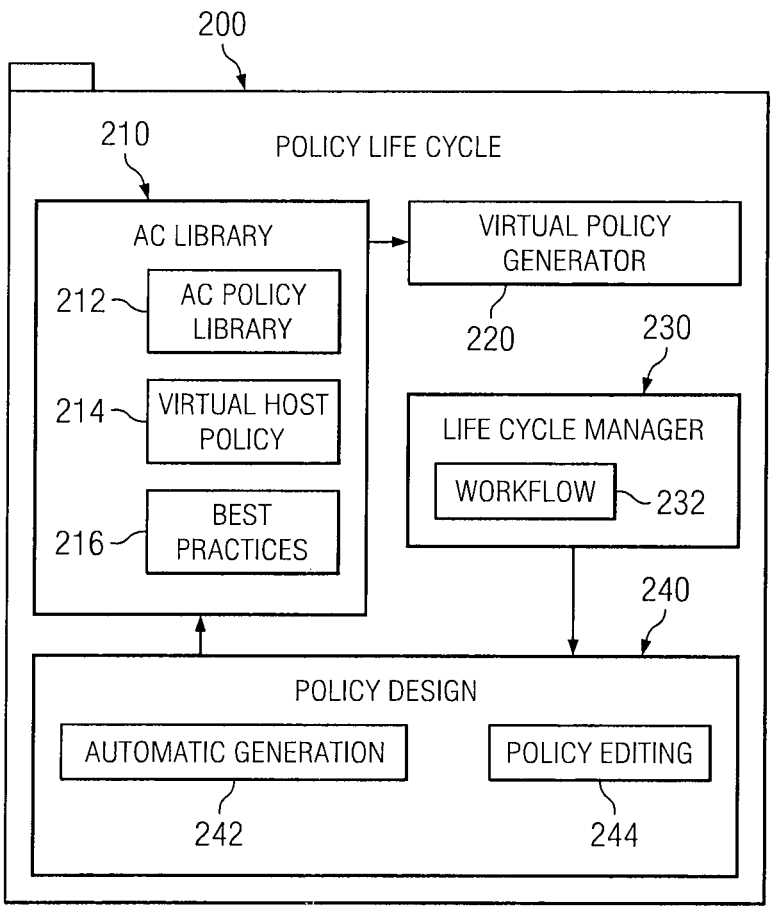
FIG. 4 illustrates example details of the policy life cycle component of the cloud computing system architecture of FIG. 3, according to certain embodiments.

FIG. 4 shows the policy life cycle component 200 of FIG. 3 according to one embodiment. The policy life cycle component 200 features an AC library 210, an AC virtual policy generator 220, a life cycle manager 230, and a policy design 240. Although this particular implementation of the policy life cycle component 200 is illustrated and primarily described, embodiments may include any suitable implementation of the policy life cycle component 200 according to particular needs.

In some embodiments, the AC library 210 may be responsible for maintaining a repository of policies. In one example embodiment, the AC library 210 may feature an AC policy library 212, a virtual host policy 214, and a best practices repository 216. In some embodiments, the AC policy library may maintain the repository of policies from different types, including policies directed to enforcing the virtual host policy 214. In some embodiments, the best practices repository 216 may explain how to configure policies and explain the application of each security rule.

In some embodiments, the AC virtual policy generator 220 may be responsible for issuing specific operating system ("OS") virtual host policy rules to hinder or approve cross-platform security permission. For example, in some embodiments, the AC virtual policy generator 220 may approve cross-platform security permissions for Solaris Zones, Logical Domains ("LDOMs"), Microsoft Virtual Sever and Hyper-v, Linux XEN, and/or VMWare ESX. In some embodiments, the virtual host policy rules may be aggregated, hierarchical, and/or compatible with multiple guests. In some embodiments, a specific operating system virtual host policy rule may operate in a multi-tenancy environment in which the operating system runs for multiple guest virtual machines. In some embodiments, the virtual policy generator 220 may provide a connection to the best practices repository 216 as well as readymade policies for some of the supported host environments, including universal common policies for different platforms.

In some embodiments, the life cycle manager 230 may be responsible for maintaining the integrity and compliance of the policies. For example, in one embodiment, the life cycle manager 230 may govern a workflow 232 around permissions and changes of the new and to-be-deployed policies.

In some embodiments, the policy design 240 may provide automatic generation of policies. For example, in one embodiment, the policy design 240 may include automatic generation 242, which may leverage on the AC policy library 212 and/or enable manual modeling using a policy editing component 244. In some embodiments, the policy design 240 may send the prepared policy to the topology management 300.

Figure 5:
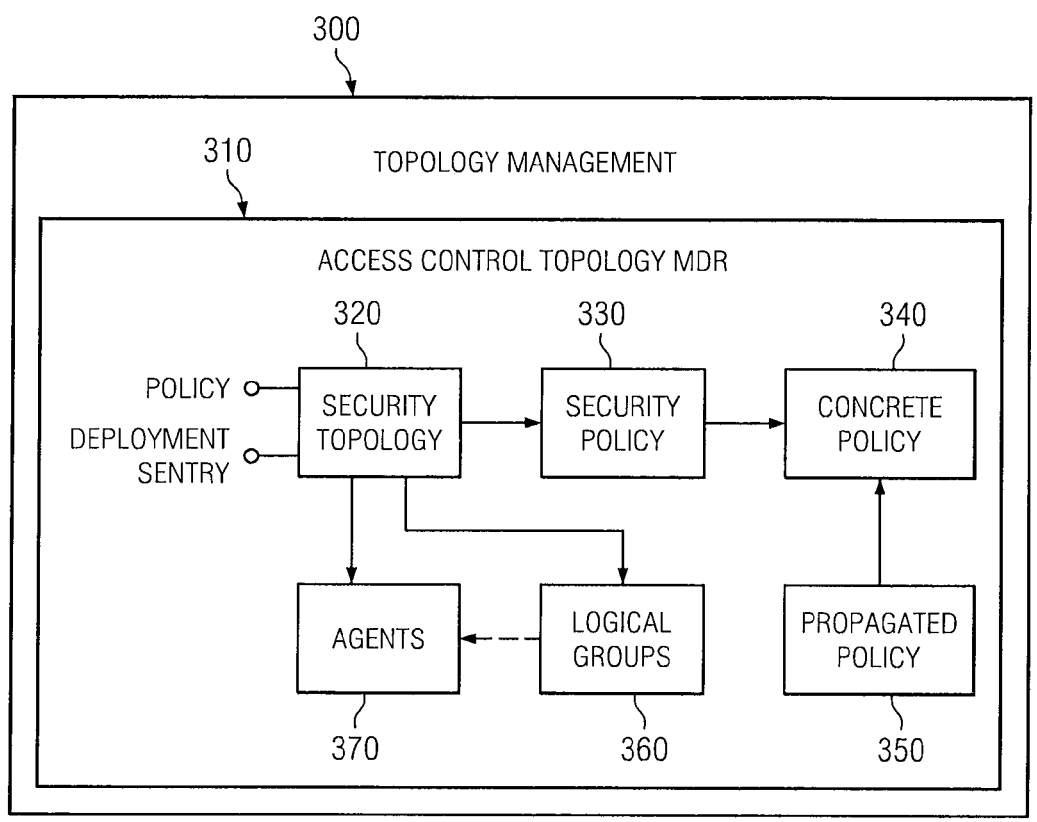
FIG. 5 illustrates example details of the topology management component of the cloud computing system architecture of FIG. 3, according to certain embodiments.

FIG. 5 shows the topology management component 300 of FIG. 3 according to one embodiment. The topology management component 300 features an access control topology MDR 310. Although this particular implementation of the topology management component 300 is illustrated and primarily described, embodiments may include any suitable implementation of the topology management component 300 according to particular needs.

In some embodiments, the access control topology MDR 310 may feature a security topology 320, a security policy 330, a concrete policy 340, a propagated policy 350, a logical groups repository 360, and a list of agents 370. For example, in one embodiment, the access control topology MDR 310 may keep information in a topological MDR. The access control topology MDR 310 may assign a security policy 330 to an agent, such as the access control agent 500 of FIG. 3. The access control topology MDR 310 may assign the security policy 330 to the agent through the distribution component 400 of FIG. 3. The association of security policies 330 to agents may be stored in the security topology 320.

The access control topology MDR 310 may maintain a list of deployed agents 370, which may include agents installed on a regular host, virtual host, or virtual machine. The access control topology MDR 310 may also maintain concrete policy 340, which is deployed on a single physical agent. The access control topology MDR 310 may also maintain the propagated policy 350, which is a set of aggregated polices for a collection of virtual machines of other types of policies on a single host, such as a regular host or a virtual host. The logical groups 360 may define the conceptual grouping of policies; for example, in one scenario, the conceptual grouping of policies may imply the need to enforce the same type of policy on different hosts.

In some embodiments, the access control topology MDR 310 may be responsible for organizing the policies to be deployed as a propagated policy. For example, the structure of the policies may built on separated additions (policy increments) and may enable changes of rules without generating a new policy. Teachings of certain embodiments recognize that a propagated policy may support multiple access control agents within a single policy file.

Figure 6:
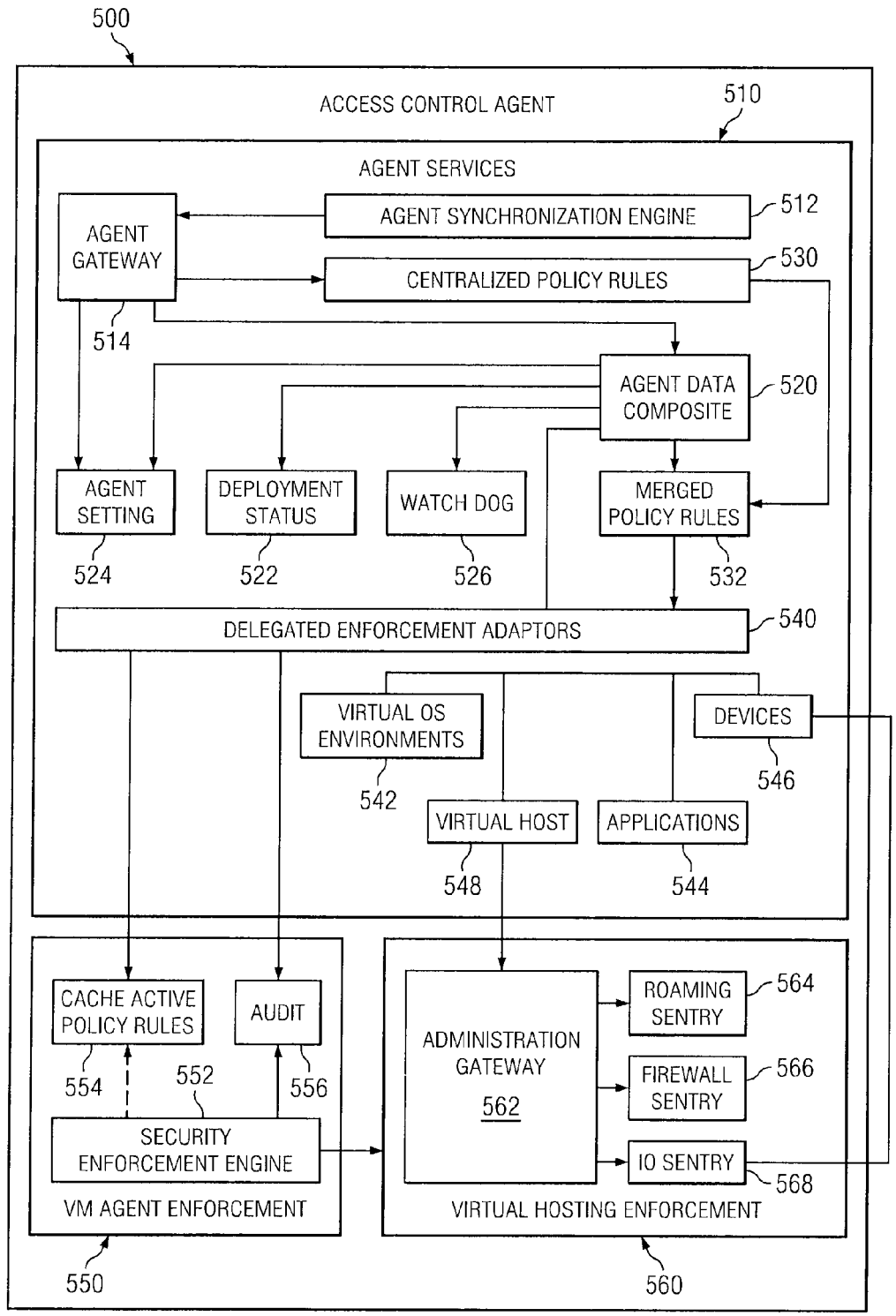
FIG. 6 illustrates example details of the access control agent of the cloud computing system architecture of FIG. 3, according to certain embodiments.

FIG. 6 shows the access control agent 500 of FIG. 3 according to one embodiment. The access control agent 500 features an agent services component 510, a virtual machine agent enforcement component 550, and a virtual hosting enforcement component 560. Although this particular implementation of the access control agent 500 is illustrated and primarily described, embodiments may include any suitable implementation of the access control agent 500 according to particular needs.

In one embodiment, the agent synchronization engine 512 may determine the connectivity pattern to the main servers using the distribution component 400 or the collection component 600. The agent gateway 514 may be responsible for communicating with external components, collecting reports, and/or receiving needs for security policies, such as the security policies 330. The agent data composite component 520 may include a deployment status 522, an agent setting 524 (which may include information such as synchronization timing), and a watchdog status 526 that indicates whether the agent is active. A centralized policy rules component 530 may be deployed on enforcing engines. For example, the centralized policy rules component 530 may be deployed on a single host in cases of regular hosts, or on virtual hosts if the rules are targeted for virtual machines or targeted for hardening the virtual host itself. The collective set of policies from the centralized policy rules component 530 may be inserted into the merged policy rules component 532, which maintains all rules originated from different needs, such as for applications, devices, or local adjustments and sporadic changes.

The delegated enforcement adaptors 540 may receive aggregated rules and connect to different virtual OS environments 542 or harden a guest virtual machine. The delegated enforcement adaptors 540 may communicate and delegate policy rules to the different guests, such as the guest virtual machines. The delegated enforcement adaptors 540 may delegate the need to enforce running applications 544 installed on the hosts, such as Oracle DB, SQL Server DB, or any other suitable database management system. The delegated enforcement adaptors 540 may delegate the request for enforcement to devices 546 and their relative local enforcement agents, which may be embedded within the devices, or add-ons. The delegated enforcement adaptors 540 may also delegate the need for enforcing new policy rules for controlling the virtual host 548 that runs all the virtual machines. The delegated enforcement adaptors 540 may also generate a risk assessment of the overall integrity.

In one embodiment, the virtual machine agent enforcement component 550 may communicate with the agent gateway 514 through the delegated enforcement adaptors 540. In some embodiments, the virtual machine agent enforcement component 550 may provide a security enforcement engine 552 that uses cache active policy rules 554. The cache active policy rules may represent minimal, aggregated rules that are prepared by the merged policy rules component 532. The security enforcement engine 552 may report on actual enforcement, as well as on runtime behavior using an audit entity 556. Teachings of certain embodiments recognize that the security enforcement engine 552 may provide information on proactive adaptation or help users understand potential threat behavior.

In one embodiment, the virtual hosting enforcement component 560 may be responsible for mitigating the risks associated with the specific problems of server virtualization and virtual hosting. In some embodiments, the virtual hosting enforcement component 560 may feature an administration gateway 562, a roaming sentry 564, a firewall sentry 566, and an IO sentry 568.

In some embodiments, the administration gateway 562 may receive a virtual host policy from the virtual host adaptor 548. The administration gateway 562 may enable a passageway to a role that is defined as a virtual administrator. This role may be able to access other virtual machines, bypassing security limits and enabling recovery and organization of another image on the same machine. The administration gateway 562 may delegate specific restrictions from the virtual host policy set to the roaming sentry 564, the firewall sentry 566, and/or the IO sentry 568.

In this example, the roaming sentry 564 may prevent the actual roaming and movement of a virtual machine image from one physical location to another. The roaming sentry 564 may incorporate a roaming prohibition policy, which may be required by compliance and governance needs, e-discovery needs, or other limitations. The firewall sentry 566 may use access control identity based network filtering between virtual machines on a shared virtual network and may limit the access between virtual machines and between identities within the virtual machines. The IO sentry 568 may extend access control capabilities in limiting and controlling kernel calls to the level of limiting access to input/output devices such as storage, network, mouse, keyboard, and the like.

Embodiments of the access control agent 500 may be deployed in any suitable manner. For example, in one embodiment, an embodiment of the agent services component 510 may be deployed on each host in a single-security administration domain. In this example embodiment, the virtual machine agent enforcement component 550 may be deployed on each virtual machine residing on a host, and the virtual hosting enforcement component 560 may be deployed on the host. Teachings of certain embodiments recognize that the virtual machine agent enforcement component 550 may be deployed on each virtual machine to protect that virtual machine and the virtual hosting enforcement component 560 may be deployed on the host to protect that host. However, embodiments are not limited to single-security administration domains, but rather embodiments may be deployed across multiple domains managed by multiple administrations.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A system comprising one or more processors coupled to a memory, the one or more processors when executing logic encoded in the memory providing:

a policy life cycle component, configured to:
  maintain a repository of security policies, the repository of security policies comprising policies governing access to a virtual host and to a plurality of virtual machines running on the virtual host; and
  issue a compound policy for an identified virtual operating system running on the virtual host, the compound policy providing a virtual host policy and access rules for each of the plurality of virtual machines running on the virtual host; and a topology manager, configured to:
  receive the compound policy from the policy life cycle component;
  assign the compound policy to an access control agent; and
  maintain a security policy topology, the security policy topology storing associations between access control agents and compound policies;

the access control agent further configured to:
  recognize one of the plurality of virtual machines running on the virtual host;
  validate the location of the one of the plurality of virtual machines on the virtual host; and
  prevent the one of the plurality of virtual machines from roaming off of the virtual host.

2. The system of claim 1, the access control agent configured to:
  receive the compound policy from the topology manager;
  delegate the access rules to a virtual machine agent enforcement component, the virtual machine agent enforcement component enforcing the access rules on one of the plurality of virtual machines; and
  delegate the virtual host policy to the virtual host, the virtual host policy comprising rules regulating cross-platform security permissions.

3. The system of claim 2, the access control agent further providing an input-output sentry configured to:

filter communications between an input/output device installed at the virtual host and one of the plurality of virtual machines running on the virtual host based on the access rules.

4. The system of claim 2, the access control agent further providing a roaming sentry configured to:
prevent roaming of one of the plurality of virtual machines from the virtual host to an unauthorized location.

5. The system of claim 2, the access control agent further providing a firewall sentry configured to:
filter communications among the plurality of virtual machines running on the virtual host based on the access rules.

6. The system of claim 1, wherein the virtual host is provided by a specific vendor, the policy life cycle component further configured to:
define a unique vendor package, the unique vendor package comprising instructions and configurations in compliance with the specific vendor; and
package the unique vendor package with the compound policy such that the compound policy is in compliance with the specific vendor.

7. The system of claim 1, the policy life cycle further configured to:
receive user edits to the compound policy; and
update the compound policy based on the user edits.

8. A method comprising:
at a policy life cycle component comprising logic encoded in one or more media for execution:
maintaining a repository of security policies, the repository of security policies comprising policies governing access to a virtual host and to a plurality of virtual machines running on the virtual host; and
issuing a compound policy for an identified virtual operating system running on the virtual host, the compound policy providing a virtual host policy and access rules for each of the plurality of virtual machines running on the virtual host; and
at a topology manager comprising logic encoded in one or more media for execution:
receiving the compound policy from the policy life cycle component;
assigning the compound policy to an access control agent; and maintaining a security policy topology, the security policy topology storing associations between access control agents and compound policies;
at the access control agent:
recognizing one of the plurality of virtual machines running on the virtual host;
validating the location of the one of the plurality of virtual machines on the virtual host; and
preventing the one of the plurality of virtual machines from roaming off of the virtual host.

9. The method of claim 8, further comprising at the access control agent:
receiving the compound policy from the topology manager;
delegating the access rules to a virtual machine agent enforcement component, the virtual machine agent enforcement component enforcing the access rules on one of the plurality of virtual machines; and
delegating the virtual host policy to the virtual host, the virtual host policy comprising rules regulating cross-platform security permissions.

10. The method of claim 8, further comprising, at an input-output sentry comprising logic encoded in one or more media for execution:
filtering communications between an input/output device installed at the virtual host and one of the plurality of virtual machines running on the virtual host based on the access rules.

11. The method of claim 8, further comprising, at a roaming sentry comprising logic encoded in one or more media for execution:
preventing roaming of one of the plurality of virtual machines from the virtual host to an unauthorized location.

12. The method of claim 8, further comprising, at a firewall sentry comprising logic encoded in one or more media for execution:
filtering communications among the plurality of virtual machines running on the virtual host based on the access rules.

13. The method of claim 8, wherein the virtual host is provided by a specific vendor, the method at the policy life cycle component further comprising:
defining a unique vendor package, the unique vendor package comprising instructions and configurations in compliance with the specific vendor; and
packaging the unique vendor package with the compound policy such that the compound policy is in compliance with the specific vendor.

14. The method of claim 8, further comprising, at the policy life cycle component:
receiving user edits to the compound policy; and
updating the compound policy based on the user edits.

15. Logic encoded in one or more tangible computer-readable storage media for execution and when executed operable to provide:
a policy life cycle component, configured to:
maintain a repository of security policies, the repository of security policies comprising policies governing access to a virtual host and to a plurality of virtual machines running on the virtual host; and
issue a compound policy for an identified virtual operating system running on the virtual host, the compound policy providing a virtual host policy and access rules for each of the plurality of virtual machines running on the virtual host; and
a topology manager, configured to:
receive the compound policy from the policy life cycle component;
assign the compound policy to an access control agent; and
maintain a security policy topology, the security policy topology storing associations between access control agents and compound policies;
the access control agent further configured to:
recognize one of the plurality of virtual machines running on the virtual host;
validate the location of the one of the plurality of virtual machines on the virtual host; and
prevent the one of the plurality of virtual machines from roaming off of the virtual host.

16. The logic of claim 15, the access control agent configured to:
receive the compound policy from the topology manager;
delegate the access rules to a virtual machine agent enforcement component, the virtual machine agent enforcement component enforcing the access rules on one of the plurality of virtual machines; and
delegate the virtual host policy to the virtual host, the virtual host policy comprising rules regulating cross-platform security permissions.

17. The logic of claim 16, the access control agent further providing an input-output sentry configured to:
  filter communications between an input/output device installed at the virtual host and one of the plurality of virtual machines running on the virtual host based on the access rules.

18. The logic of claim 16, the access control agent further providing a roaming sentry configured to:
  prevent roaming of one of the plurality of virtual machines from the virtual host to an unauthorized location.

19. The logic of claim 16, the access control agent further providing a firewall sentry configured to:
  filter communications among the plurality of virtual machines running on the virtual host based on the access rules.

20. The logic of claim 15, wherein the virtual host is provided by a specific vendor, the policy life cycle component further configured to:
  define a unique vendor package, the unique vendor package comprising instructions and configurations in compliance with the specific vendor; and
  package the unique vendor package with the compound policy such that the compound policy is in compliance with the specific vendor.

21. The logic of claim 15, the policy life cycle further configured to:
  receive user edits to the compound policy; and
  update the compound policy based on the user edits.

\* \* \* \* \*